May 27, 1947.   D. A. McLEAN   2,421,035
COMPOSITION FOR AND METHOD OF EXTINGUISHING FIRES
Filed June 10, 1942
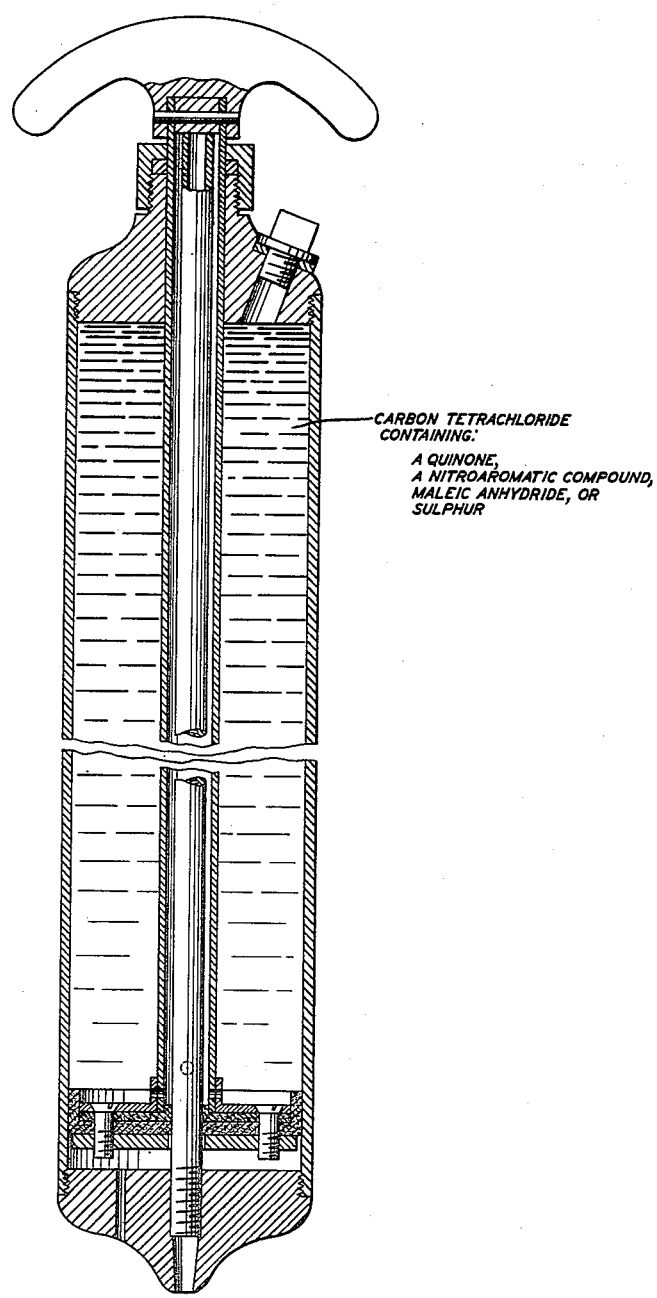
INVENTOR
D. A. McLEAN
BY
B. H. Jackson
ATTORNEY Patented May 27, 1947

2,421,035

UNITED STATES PATENT OFFICE 2,421,035

COMPOSITION FOR AND METHOD OF EXTINGUISHING FIRES

David A. McLean, Chatham, N. J., assignor to Bell Telephone Laboratories, Incorporated, New York, N. Y., a corporation of New York Application June 10, 1942, Serial No. 446,472

6 Claims. (Cl. 252—8)

This invention relates to fire extinguishing fluids and methods of extinguishing fires.

The carbon tetrachloride type of fire extinguishing fluid has had its utility somewhat limited in the past due to the fact that it has been found that when this fluid is directed on hot metal, poisonous phosgene fumes are sometimes generated. This result is apparently due to the catalytic action of the metal, which promotes reaction between the carbon tetrachloride and the oxygen of the air. Even though the risk of generation of this poisonous gas has been small in many instances, the hazard has often been considered sufficient to discourage the use of this type of extinguisher.

The present invention is based upon the discovery that the addition of small amounts of certain soluble substances to chlorine-containing carbon compounds will, possibly by a catalyst poisoning action, retard or eliminate the generation of certain gaseous decomposition products, among them phosgene, which are ordinarily generated when these chlorinated compounds are maintained in contact with metals at elevated temperatures. The substances found effective to retard such phosgene formation are sulphur, maleic anhydride (or its alkyl substituted derivatives), the nitro-aromatic compounds or the quinones. Any one of these types of substances may be dissolved in a carbon tetrachloride fire extinguishing fluid for the purposes of the present invention. However, since the effectiveness of each type of substance in retarding phosgene formation varies somewhat with different metals, it is desirable in some instances to include a combination of several or all of the abovementioned types of phosgene suppressors.

Among the quinones suitable for the purposes of the present invention may be mentioned the ortho, meta and para quinones, such as benzoquinone, naphthoquinone, acenaphthoquinone, anthraquinone and phenanthraquinone. Not only the quinones themselves but also the substituted derivatives of the quinones are effective. Among the suitable substituted quinones may be mentioned toluoquinone, xyloquinone, methylanthraquinone and chloroanthraquinone.

Among the suitable nitro-aromatic compounds may be mentioned nitrobenzene, p-nitrochlorobenzene, o-nitrochlorobenzene, alpha nitronaphthalene, p-nitrotoluene, 2-nitro 6-chlorotoluene, trichlornitro m-fluorotoluene, pentamethylnitrobenzene, 5-nitro 3,4-dichloro-o-xylene, p-nitrodiphenyl, o-dinitrobenzene, dinitroprehnitene, dinitrodurene, and nitroquinoline.

Among the suitable alkyl substituted derivatives of maleic anhydride may be mentioned the methyl derivatives, such as citraconic anhydride or dimethyl maleic anhydride, and the ethyl derivatives, such as diethylmaleic anhydride. The acids of these anhydrides may also be used.

These phosgene suppressors may be added in any suitable concentration to the fire extinguishing fluid. They show some effectiveness in concentrations as low as .1 per cent by weight of the carbon tetrachloride but do not reach their full potential effectiveness below about .25 per cent. The full effect of the suppressor is usually achieved when it is present in an amount of about 2 per cent by weight. However, obviously considerably larger proportions, within the limits of solubility, may be employed if they do not impart otherwise undesirable characteristics to the fluid. Desirable concentrations are usually about .5 per cent and about 1 per cent.

As specific examples of the fire extinguishing fluids of the present invention may be mentioned carbon tetrachloride containing about 1 per cent anthraquinone; carbon tetrachloride containing about 1 per cent p-nitrodiphenyl; carbon tetrachloride containing about 1 per cent paranitrochlorobenzene; carbon tetrachloride containing about 2 per cent sulphur; carbon tetrachloride containing about 2 per cent maleic anhydride; carbon tetrachloride containing 1 per cent anthraquinone and 1 per cent paranitrochlorobenzene; carbon tetrachloride containing 1 per cent anthraquinone, 1 per cent p-nitrodiphenyl and 1 per cent sulphur; and carbon tetrachloride containing about .5 per cent anthraquinone, .5 per cent paranitrochlorobenzene, .5 per cent sulphur, and .5 per cent maleic anhydride.

In the accompanying drawing is illustrated a common type of hand fire extinguisher for use with carbon tetrachloride fire extinguishing fluids. For the purposes of the present invention this type of extinguisher may be filled with the fire extinguishing fluid of the present invention described above. The construction and method of operation of this type of extinguisher are well known and are described in detail, for instance, in United States Patent No. 1,308,546. For extinguishing a fire, the stream of fluid from the extinguisher nozzle is directed at the blaze to be extinguished.

The fire extinguishing fluids of the present invention may obviously be used in any extinguisher commonly used for carbon tetrachloride fluids, as for instance, the bomb type extinguisher which bursts when thrown into a blaze from either the physical shock of landing or the heat of the fire.

The invention has been described with reference to carbon tetrachloride extinguishing fluids since carbon tetrachloride is the chlorinated carbon compound most commonly used for this purpose. Obviously, however, the phosgene suppressors described above may be used with any volatile, or even non-volatile, halogenated or chlorinated carbon compound which is suitable for extinguishing fires and which is subject to the hazard of phosgene generation.

Although the invention has been described with reference to its specific embodiments, certain modifications and equivalents will be apparent to those skilled in the art and are intended to be included within the scope of the present invention, which is to be limited only by the fair and reasonable scope of the appended claims.

What is claimed is:

1. A fire extinguishing fluid consisting of carbon tetrachloride containing a small amount of a quinone.

2. A fire extinguishing fluid consisting of carbon tetrachloride containing between about .1 per cent and about 2 per cent by weight of anthraquinone.

3. The method of extinguishing fires which comprises introducing into the vicinity of a fire a quantity of the fire extinguishing fluid described in claim 6.

4. The method of extinguishing fires which comprises introducing into the vicinity of a fire a quantity of the fire extinguishing fluid described in claim 1.

5. A fire extinguishing fluid consisting of carbon tetrachloride containing, as phosgene suppressors, anthraquinone, paranitrochlorobenzene and maleic anhydride, each of the phosgene suppressors being present in an amount of between about .1 per cent and about 2 per cent by weight of the carbon tetrachloride.

6. A volatile chlorinated carbon compound fire extinguishing fluid containing a small amount of a phosgene suppressing means dissolved therein, said phosgene suppressing means comprising a quinone in an amount between about .1 per cent and about 2 per cent by weight of the chlorinated carbon compound.

DAVID A. McLEAN.

REFERENCES CITED

The following references are of record in the file of this patent:

UNITED STATES PATENTS

| Number | Name | Date |
| --- | --- | --- |
| 1,036,461 | Davidson | Aug. 20, 1912 |
| 1,617,251 | Herbline | Feb. 8, 1927 |
| 2,008,680 | Carlise et al. | July 23, 1935 |
| 1,949,857 | Braun | Mar. 6, 1934 |